Sept. 30, 1930.  A. E. SHORT ET AL  1,777,232
AMPHIBIAN AIRCRAFT
Filed Nov. 14, 1929  3 Sheets-Sheet 1

Sept. 30, 1930.  A. E. SHORT ET AL  1,777,232
AMPHIBIAN AIRCRAFT
Filed Nov. 14, 1929  3 Sheets-Sheet 2
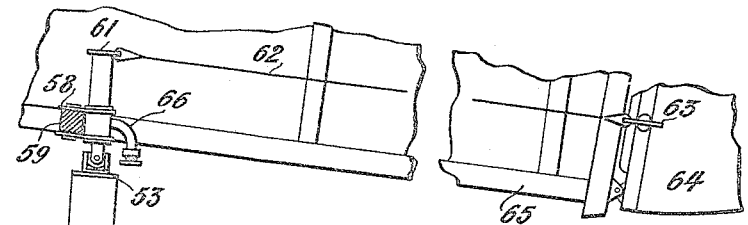
FIG.2.
FIG.3.
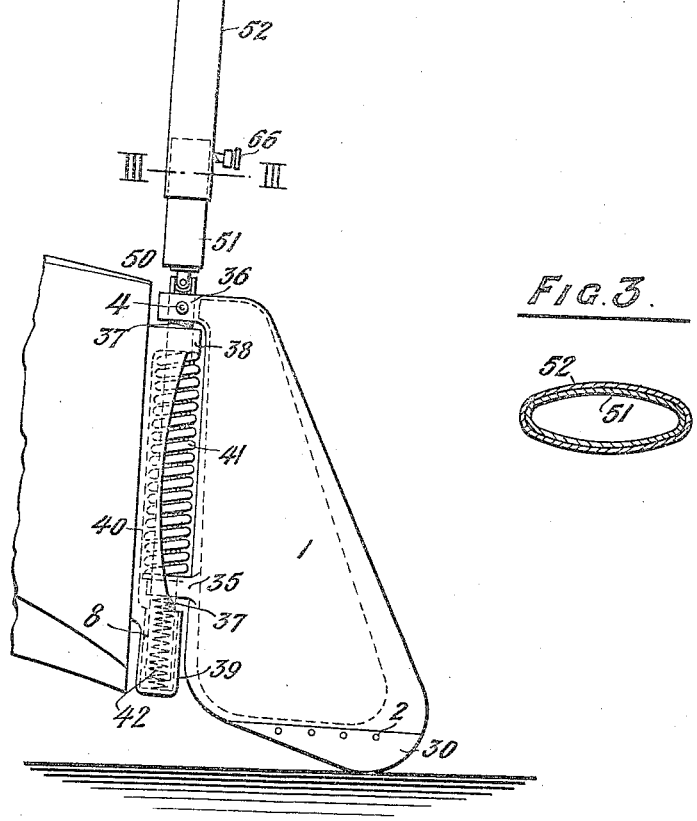

Patented Sept. 30, 1930

1,777,232

UNITED STATES PATENT OFFICE

ALBERT EUSTACE SHORT AND HUGH OSWALD SHORT, OF ROCHESTER, ENGLAND

AMPHIBIAN AIRCRAFT

Application filed November 14, 1929, Serial No. 407,201, and in Great Britain June 5, 1929.

This invention relates to amphibian aircraft of the type in which a buoyant body, such as a float or boat is employed located centrally below the central portion or body of the machine and this body is provided with landing gear preferably in the form of wheels to enable it to descend on land. With such aircraft the landing wheels are usually mounted towards the front end of the body and it is necessary to provide a device, usually in the form of a skid, for supporting the stern end thereof.

The object of the present invention is to so make a rudder for said buoyant body that it will not only serve its normal purpose of steering said aircraft on water but will also act to support the stern end of the body when descending and resting on land, and thus economize in weight and in cost.

According to this invention a rudder for the buoyant body of amphibian aircraft with landing gear for descending on ground is constructed with a lower part which extends below the stern of the buoyant body and mounted for vertical movement relatively to said body against elastic cushioning devices, so as to act as a skid.

The stern of the buoyant body and the rudder are provided with bearings connected by a tube fixed to the bearings on one of said parts and slidably mounted in the bearings in the other part, and a large spring and a small spring located around and/or in said tube and extending between the bearings on said parts. The large spring absorbs shocks caused by contact with the ground, while the small spring absorbs reactions caused by the large spring.

The rudder may be built up from a number of separate pieces fixed together, or it may be made as a casting in which case it will have integrally cast lugs forming the bearings on the rudder.

Preferably the tube is fixed to the rudder and is connected to operating mechanism for turning said rudder about the axis of the tube for steering said buoyant body, this operating mechanism being operably connected to the air rudder so that the water rudder is moved with and by the same controls as the air rudder. In order to allow for the vertical movement of the rudder without effecting the connection to its operating mechanism for turning it, the tube is telescopically and angularly adjustably but non-rotatably connected to an operating device mounted in the body of the aircraft.

In a preferred embodiment the rudder is mounted to slide upwardly against elastic cushioning devices as well as to turn on the buoyant body and to extend below the stern of the buoyant body, and an operating device is provided for turning said rudder but allowing upward and angular relative movement of the rudder, said operating device being connected to the air rudder so that the rudder on the buoyant body is operated by and in accordance with the air rudder.

The invention will be more particularly described with reference to the embodiments shown in the accompanying drawings, in which:—

Fig. 2 is a side elevation of a modified form of rudder showing a fragment of the stern of the buoyant body on which it is mounted, and showing the operating mechanism for the rudder in its association with a fragment of the aircraft body.

Fig. 3 is a cross-sectional view on line III—III in Fig. 2.

Figure 1:
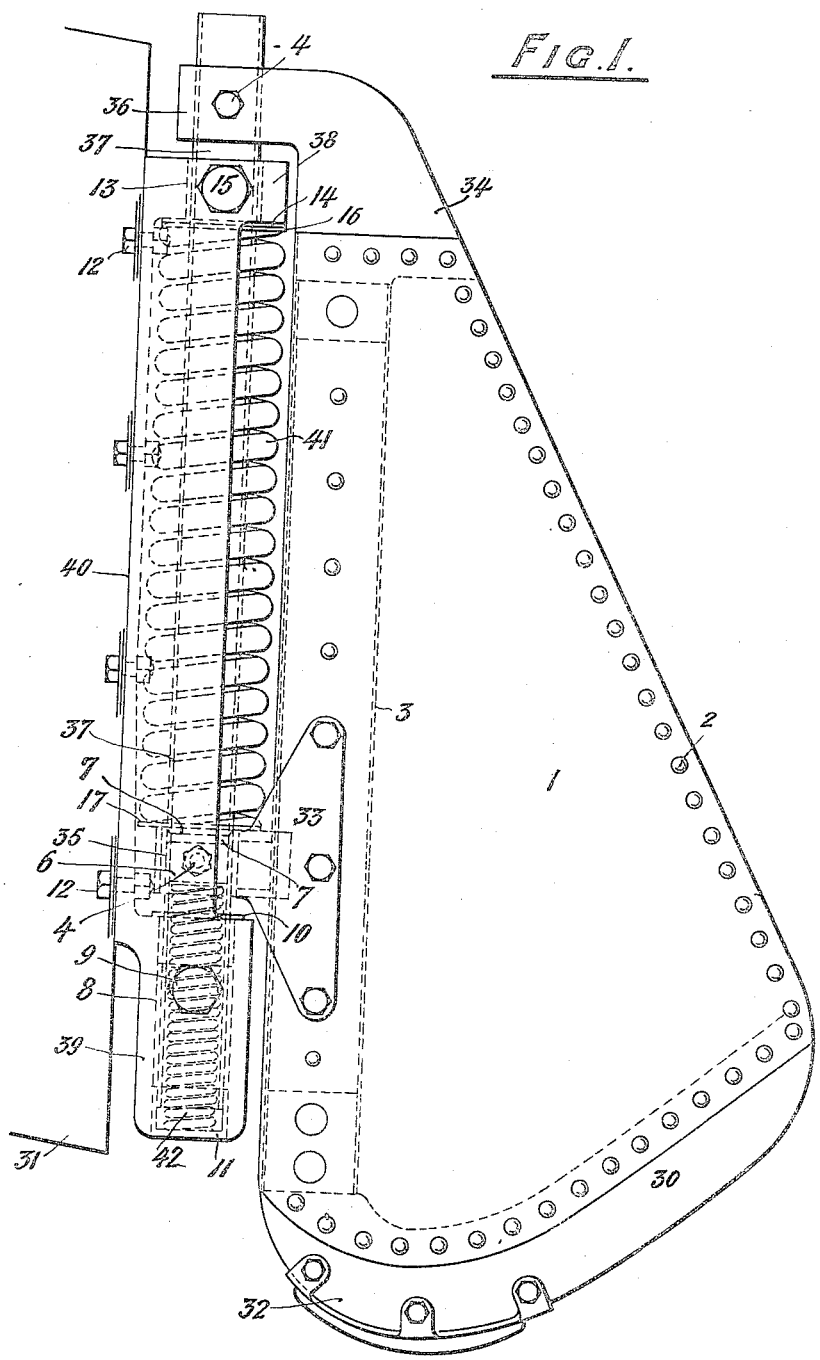
Fig. 1 is a side elevation of the rudder and a fragment of the stern of the buoyant body on which it is mounted.

In Fig. 1 of the drawings the rudder is built up of two plates 1, only one of which is shown, the other being located directly behind that shown, connected together by rivets 2. At its forward end the rudder is provided with a framing member 3 clamped between the plates 1 thereof. On this rudder there is fixed by means of the rivets 2 a lower part 30 whose sides are flared outwards so that the lower edge thereof is broader than the main part of the rudder. The plates and this lower part are so constructed that they both extend below the stern 31 of the buoyant body and the broadened and projecting base of the lower part 30 has fixed thereto a shoe 32 which is adapted to contact with the ground on landing.

Fixed to the framing member 3 and the rudder are two brackets 33 and 34. These brackets are spaced apart, the one 33 being fixed approximately at the centre of the rudder, and the other bracket 34 being fixed at the upper end of the rudder. The central bracket 33 is provided with a forwardly extending boss 35, and the upper bracket 34 is provided with a corresponding forwardly extending boss 36. These bosses 35 and 36 form spaced bearings on said rudder. A tube 37 extends through the bosses 35 and 36 and is fixed thereto by means of set pins 4. This tube is slidably mounted in bearings formed by the hollow boss portions 38 and 39 of a trough-shaped bearing frame 40, which is fixed by means of nuts and bolts 12 to the stern of the buoyant body 31. The boss portion 38 is provided with a bearing sleeve 13 fixed by means of a set screw 15 and having an integral flange 14 on the underside thereof and this boss 38 is normally located just below the boss 36, while the boss 39 is normally located just below the boss 35. Located around the tube 37 and extending between and bearing against washers 16 and 17 on the boss 38 and the boss 35, respectively, there is mounted a large helical spring 41. Also located around the interior of the tube 37 and between the boss 35 and the boss 39 there is mounted a small helical spring 42. This spring 42 abuts at its upper end against an abutment 6 fixed by means of a transverse rivet 7 within the tube 37 and a sleeve 8 fixed within the boss 39 by means of the set pin 9 and having an outer flange 10 extending over the top of the boss 39 and a closed end 11 forms an abutment for the lower end of the spring 42. Thus, the rudder is so arranged that along with its bearing bosses 35 and 36 and the tube 37, it can move vertically upwards against the main spring 41 which acts as an elastic cushioning means to absorb shock. Vertical reaction of the rudder downwardly takes place against the action of the small spring 42. Thus the main spring 41 will take the main shocks on landing, while the small spring 42 will take the reaction caused by the main spring.

Moreover, the rudder can be turned about the axis of the tube so that it can serve its normal function as a rudder when the aircraft is landing on water.

In the modified form of rudder shown in Fig. 2 the arrangement and disposition of the parts is similar to that of the rudder shown in Fig. 1, and therefore like numerals have been applied to parts which are like those in Fig. 1. In this case, however, the upper part 1 of the rudder is made as a light metal casting having the bosses 35 and 36 formed as integrally cast lugs. The lower part 30, which is made separately from the upper part and is secured thereto by the rivets 2, serves as a shoe and contacts with the ground on landing.

Figure 4:
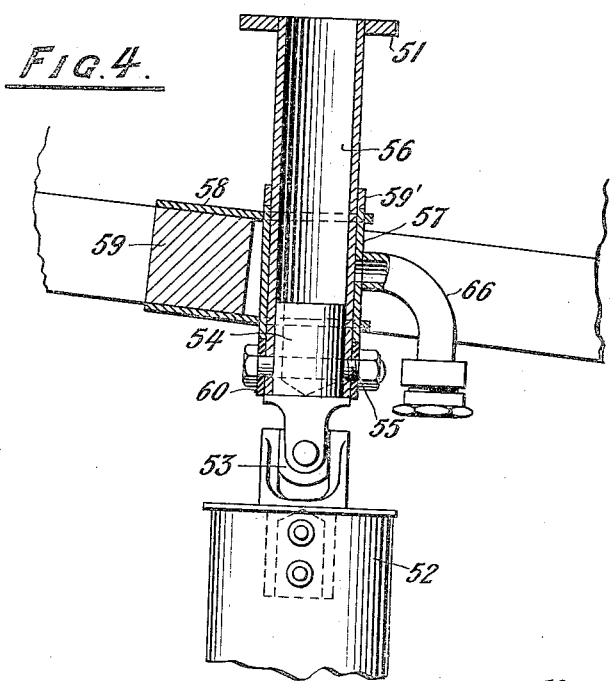
Fig. 4 is an enlarged view partly in section of the means for mounting the operating mechanism in the aircraft body.

The method of operating the rudder as shown in Figs. 2, 3 and 4 comprises a universal joint 50 connecting the tube 37 to the lower part 51 of a tubular operating member, which lower part 51 is telescopically mounted in the upper part 52 so that these two parts can move telescopically, but they are made of oval cross-sectional shape as shown in Fig. 3 so that they are prevented from rotating relatively to each other. The upper part 52 of the operating member is also connected by a universal joint 53 and by a spigot 54 and cross bolt 55 thereon, to a sleeve 56 which is rotatably mounted in a bearing 57 fixed by brackets 58 to the cross member 59 of the fuselage of the seaplane. The sleeve 56 is prevented from movement endwise in the bearing 57 by means of the ring 59' fixed at one end thereof and abutting against one end of the bearing 57, and by the boss 60 fixed on the other end of the sleeve 56 by the cross bolt 55 and abutting against the corresponding end of the bearing 57. The sleeve extends into the interior of the fuselage and is provided at its upper end with lever arms, of which only one is shown marked 61 but of which there are two, one extending at each side of the sleeve and at complementary angles relatively to each other. These arms 61 are connected by cables 62 extending through the fuselage to lever arms 63 on the air rudder 64 turnably mounted at the rear end of the fuselage 65. Lubricating devices 66 are provided between the relatively movable parts of this mechanism. With this mechanism the rudder 1 is rotated by and in accordance with the movement of the air rudder 64 and is operated by the usual controls for the air rudder 64. The universal joints 50 and 53 allow of the necessary relative angular movement of the parts, while the telescopic arrangement of the parts 51 and 52 allows for the movement of the rudder upwardly when landing on ground.

Figure 5:
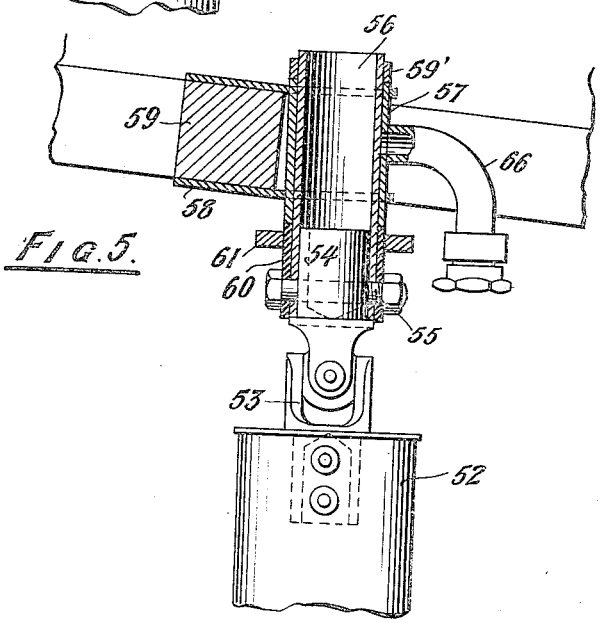
Fig. 5 is a similar view to Fig. 3 but shows a modified form of mounting means.

The arrangement shown in Fig. 5 is similar to that shown in Fig. 4, and like parts are designated by like reference numerals to those in Fig. 4, but in this case the connecting cable 62 is located externally of the fuselage, the lever arms 61 being in this case fixed to or formed integral with the boss 60, so that these arms are located just below the fuselage, and in this case connecting cables extend along and are substantially parallel to the fuselage and are connected to the air rudder at its lower corner.

Springs may be provided in the cables 62 for equalizing the stresses on these cables.

What we claim as our invention and desire to secure by Letters Patent is:—

1. A rudder for the buoyant body of amphibian aircraft with landing gear, having a lower part constructed to extend below the stern of the buoyant body, spaced bearings on said rudder, a tube fixed to said bearings, bearings for slidably supporting said tube adapted to be fixed on the said buoyant body, and springs between the bearings on the rudder and the bearings on said body so that said rudder acts as a skid when descending on land.

2. A rudder for the buoyant body of amphibian aircraft with landing gear, having a lower part constructed to extend below the stern of the buoyant body, spaced bearings on said rudder, a tube fixed to said bearings, and a large spring and a small spring associated with the tube and between the bearings on the rudder and the bearings on said body so that said rudder acts as a skid when descending on land.

3. A rudder for the buoyant body of amphibian aircraft with landing gear comprising an upper part made as a casting having integrally cast lugs forming bearings, a lower part adapted to extend below said body so as to contact with the ground on landing, mounting means for vertically movable and turnably mounting said bearings, and elastic cushioning devices in said mounting means elastically to arrest the vertical movement so that said rudder acts as a skid when descending on land.

4. A rudder for the buoyant body of amphibian aircraft with landing gear comprising an upper part made as a casting having integrally cast lugs forming bearings, a lower part adapted to extend below said body so as to contact with the ground on landing, mounting means for vertically movable and turnably mounting said bearings, spaced bearings on said body, a tube fixed to said cast lugs and slidable vertically in said spaced bearings, and elastic cushioning devices in said mounting means elastically to arrest the vertical movement so that said rudder acts as a skid when descending on land.

5. In association with a buoyant body of amphibian aircraft, a rudder at the stern thereof and extending downwardly below the body, spaced bearings fixed in said rudder, a tube fixed to said bearings, bearings on said body slidably and turnably supporting said tube, and springs around said tube between the spaced bearings fixed to the rudder and the bearings on the body so that said rudder acts as a skid when descending on land.

6. Amphibian aircraft having a buoyant body, landing gear on said body, a rudder on and extending below said body, adapted to contact with the ground on landing; bearings on said rudder; a tube fixed in said bearings; bearings on said body vertically slidably and turnably mounting said tube; elastic cushioning means for arresting the vertical sliding movement; an operating device adjustably and telescopically connected to said tube, and means operably connecting said operating device to an air rudder on said aircraft.

7. Amphibian aircraft having a buoyant body; landing gear on said body; a rudder on and extending below said body, adapted to contact with the ground on landing; upper and lower bearings on said body; spaced bearings on said rudder; a tube fixed to said bearings on the rudder and slidably and turnably mounted in the upper and lower bearings on the said body; a main spring and a reaction spring between said bearings on the rudder and body; an operating device having two parts telescopically but nonrotatably mounted, and means operably connecting said device to an air rudder on said aircraft.

In witness whereof we have hereunto set our hands.

ALBERT EUSTACE SHORT.
HUGH OSWALD SHORT.